United States Patent
Huettenhofer (10) Patent No.: US 9,266,238 B2
(45) Date of Patent: Feb. 23, 2016

(54) ROBOT CONTROL METHOD

(71) Applicant: Manfred Huettenhofer, Meitingen (DE)

(72) Inventor: Manfred Huettenhofer, Meitingen (DE)

(73) Assignee: Kuka Laboratories GmbH, Augsburg (DE)

( * ) Notice: Subject to any disclaimer, the term of this patent is extended or adjusted under 35 U.S.C. 154(b) by 216 days.

(21) Appl. No.: 13/650,384

(22) Filed: Oct. 12, 2012

(65) Prior Publication Data

US 2013/0103192 A1    Apr. 25, 2013

(30) Foreign Application Priority Data

Oct. 13, 2011  (DE) .......................... 10-2011-084 412

(51) Int. Cl.
*B25J 9/16* (2006.01)
*G05B 19/402* (2006.01)

(52) U.S. Cl.
CPC .............. *B25J 9/162* (2013.01); *G05B 19/402* (2013.01)

(58) Field of Classification Search
CPC .............. G05B 19/402; G05B 19/416; G05B 19/4182; G05B 2219/39101; G05B 2219/50353; B25J 9/162; B25J 9/1628; B25J 9/1646; B25J 9/1656; B25J 9/1664
USPC ......... 700/245–264; 414/730, 742; 901/15, 4, 901/6
See application file for complete search history.

(56) References Cited

U.S. PATENT DOCUMENTS

| | | | |
|---|---|---|---|
| 4,613,803 A * | 9/1986 | Hasegawa et al. | 701/23 |
| 4,712,183 A | 12/1987 | Shiroshita et al. | |
| 4,836,742 A | 6/1989 | Ishiguro et al. | |
| 4,954,762 A * | 9/1990 | Miyake et al. | 318/568.19 |
| 5,313,563 A | 5/1994 | Hara | |
| 5,550,953 A * | 8/1996 | Seraji | 700/263 |
| 2005/0055127 A1* | 3/2005 | Swain et al. | 700/186 |
| 2009/0037025 A1 | 2/2009 | Yamamoto | |
| 2009/0037033 A1* | 2/2009 | Phillips et al. | 701/2 |
| 2013/0123983 A1* | 5/2013 | Brog Rdh | 700/254 |

FOREIGN PATENT DOCUMENTS

| | | | |
|---|---|---|---|
| DE | 10 2009 014 766 | 9/2010 | |
| EP | 0 206 051 | 12/1986 | |
| EP | 0 271 691 | 6/1988 | |
| EP | 0 523 889 | 1/1993 | |
| EP | 0 639 805 | 8/1993 | |
| EP | 1147974 A2 * | 10/2001 | B62D 65/18 |

* cited by examiner

*Primary Examiner* — Khoi Tran
*Assistant Examiner* — Abby Lin
(74) *Attorney, Agent, or Firm* — Schiff Hardin LLP (57) ABSTRACT

Target values for position and orientation of a work point are provided in a robot program, dependent on which the program causes automatic movement of axles of the manipulator by a robot controller connected with the manipulator, to adjust a tool reference point of the manipulator. A robot base is movable via an auxiliary axle. Position values (provided by the robot program) of a planned position and orientation to be occupied by robot base for the tool reference point adjustment are automatically changed so the actual position of the robot base converges on a predetermined reference point, such as the work point or the tool reference point and the auxiliary axle is automatically moved to cause the robot base to occupy the position and orientation that correspond to the changed position values.

14 Claims, 5 Drawing Sheets

ROBOT CONTROL METHOD

BACKGROUND OF THE INVENTION

1. Field of the Invention

The invention concerns a robot control method in which target values of a work point that is predetermined in position and orientation by a robot program are provided, programmatically dependent on which a tool reference point of a manipulator is to be set via automatic movement of axles of the manipulator by a robot controller connected with said manipulator. In the invention, position values of a planned position and orientation to be occupied by a robot base that is adjustable via an auxiliary axle are assumed that are provided by the robot program.

2. Description of the Prior Art

EP 0 271 691 A1 describes a method to control the three-dimensional relative motion of a robot (with which is associated a robot coordinate system relative to the base of the robot) relative to a work piece attached to a work piece carrier in an arbitrary, fixed spatial association, wherein the path of the relative motion can be determined via significant spatial points. Moving work pieces can be arranged on moving tables (such as rotary or rotary tilt tables), or the robot itself can be arranged so as to be movable, be it that it is attached to a portal or that it is equipped with a chassis. The work piece can either be held stationary or execute a separate forward motion. According to this prior art, the spatial points present in an auxiliary axle coordinate system can be transferred directly into a robot coordinate system via a transformation condition taking the feed movement into account.

SUMMARY OF THE INVENTION

An object of the present invention is to provide a robot control method with extended movement patterns.

The Object is Achieved Via a Robot Control Method Having the Following Steps:

- provide target values of a work point provided in position and orientation by a robot program, programmatically dependent on which a tool reference point of a manipulator is to be adjusted via automatic movement of axles of the manipulator by a robot controller connected with the manipulator;
- starting from position values (provided by the robot program) of a planned position and orientation of a robot base, that is adjustable via an auxiliary axle, automatically change the position values such that the actual position of the robot base that is to be occupied by the robot base, relative to the planned position converges toward a predetermined reference point, in particular the work point or the tool reference point;
- automatically actuate the auxiliary axle such that the robot base is moved to occupy the position and orientation that correspond to the changed position values.

The target values can be provided in Cartesian coordinates and, in three-dimensional space, can encompass the three position coordinates x, y, z and the three orientation coordinates A, B, C. The target values can in particular be provided in a robot program presented in text form. The robot program includes rules of how a manipulator has to move in a chronological workflow. The manipulator can be a manipulator arm, in particular with 4 to 7 axles that can, for example, be fashioned as rotation axles. The manipulator is moved by a robot controller. The robot controller can in particular move the manipulator automatically according to the rules of the robot program.

The work point representatively stands for one or more work points that can be provided in the robot program. For example, a work point can be a point on a surface of a work piece to be processed or to be handled. For example, the work point can be a point on a shell of a motor vehicle at which a welding point should be attached by means of a welding rod held or moved by the manipulator. The welding rod is thereby an example of a tool that is moved by the manipulator. Multiple work points can represent discrete locations that are to be occupied in succession by the manipulator or the tool carried by the manipulator. However, the multiple work points can also be support points of a continuous path on the work piece, along which path the manipulator or the tool carried by the manipulator should be driven. The work point or the work points or the path does not necessarily need to be situated on the surface of the work piece; rather, these can also be virtual points or paths in space. For example, this is the case when the work piece should be processed without contact, for example for coating of a component by means of a lacquer spraying gun that is moved by the manipulator.

In general, the target values of the work points are specified in coordinates of a reference system fixed to a work piece or component, i.e. a base coordinate system linked to the work piece. The location represented by the target values should either be directly occupied by a tool reference point of the manipulator, or the tool reference point of the manipulator should be positioned and/or aligned in a fixed, programmed dependency relative to this location (i.e. be set relative to this location). However, the tool reference point of the manipulator is not specified in a robot program in the reference system fixed to the tool or, respectively, component, but rather in a reference system inherent to the robot, i.e. a robot-linked coordinate system that is also designated as a robot coordinate system. The robot coordinate system is generally specified as fixed relative to a robot base. For example, the robot base can be a base mount of a manipulator, in particular a manipulator arm.

If the work piece and the robot base are permanently installed, a constant relationship exists between the base coordinate system fixed to the work piece or component and the robot coordinate system fixed to the robot base. This relationship of base coordinate system fixed to the work piece or component to the robot coordinate system fixed to the robot base can be defined via an additional general reference system, a global coordinate system.

However, according to the invention the manipulator (in particular the robot base apparatus, and thus the work piece, and thus ultimately a work point) is not fixed in space; rather, the manipulator (in particular the robot base apparatus, and thus the work piece, and thus ultimately work point) can be adjusted automatically, meaning that the position and/or orientation of the robot base relative to the work piece can vary. This typically occurs via an auxiliary axle. Automatic actuation of such an auxiliary axle produces a movement, in a movement direction of the manipulator (in particular the robot base apparatus thereof, and thus the work piece thereof, and thus ultimately the work point). For example, the robot base can be a shuttle car or a linear axle on which the manipulator is mounted, such that the manipulator can be moved one-dimensionally along a shuttle axle, for example. The shuttle car may possibly have two degrees of freedom, meaning that it can be a vehicle that is not bound to a rail but rather can be moved freely in a plane. Alternatively or additionally, an auxiliary axle can be an additional degree of freedom in the movement of the work piece. For example, the work piece can be fastened to a rotatable or tiltable table, or be moved in a translational manner, for example on a conveyor belt or hanger.

An automatic change of the position values can take place via computationally incorporating the provided, programmed position value. However, an automatic change of the position values can also take place without incorporating the provided, programmed position value. In particular, the function of the automatic change of the position values can be activated and/or deactivated by a robot program as needed. However, the function of the automatic change of the position values can also be permanently implemented in the robot controller and be invariant.

The movement of such an auxiliary axle can take place synchronously or asynchronously with a movement of the manipulator. Synchronously can mean that a movement sequence of the manipulator and a movement sequence of the auxiliary axle start simultaneously and end simultaneously.

In a basic, practical example the manipulator is mounted on a movable carriage that forms the robot base, and the auxiliary axle is fashioned as a linear axle. In a second basic, practical example as an alternative or in addition to the first example, a work piece or a work piece carrier is mounted on a rotatory or rotary/tilt table as the robot base, which has a single auxiliary axle or two auxiliary axles.

Normally, in robot programs the desired position and orientation of the tool reference point of the manipulator that are to be occupied are specified in Cartesian coordinates of the work point (provided by target values) in the base coordinate system linked to the work piece. For both cited practical application examples, it is thus important that the current position and orientation of the robot base and of the work piece are taken into account to calculate the Cartesian position and orientation. This is also designated as active mathematical coupling between auxiliary axle and manipulator. In other words, the respective axle positions of the manipulator (i.e. the pose of the manipulator) are dependent on the current position value of the auxiliary axle or the auxiliary. axles.

If the work piece is offset, for example, it can occur that the position and orientation of the work point provided by the robot program—programmatically dependent on which the tool reference point of the manipulator is to be adjusted via automatic movement of the axles of the manipulator by the robot controller connected with said manipulator—can no longer be reached by the manipulator. According to the invention, an automatic change to the position values takes place based on the position values (provided by the robot program) of the planned position and orientation of the robot base (which robot base is adjustable via the auxiliary axle) that are to be occupied (moved to), such that the actual position of the robot base that is to be moved to converges on the work point relative to the planned position to be occupied. In other words, by automatically moving that auxiliary axle via which the robot base is adjustable, the robot base is moved automatically to the work point, possibly even independent of which position value of the auxiliary axle is provided by the robot program. This means that—in spite of a change of the work point—the tool reference point of the manipulator can reach the work point without a manual modification of the robot program (in particular of provided points or paths) needing to be implemented. For example, a robot that is attached to a shuttle car (i.e. on a carriage of a linear axle) so as to movable can process a moving work piece, for example a component located on a conveyor belt, wherein the tool reference point of the manipulator does not exclusively follow the component or, respectively, the work piece by changing the pose of the manipulator (i.e. by adjusting its robot axles); rather, it can also follow the component or, respectively, the work piece by incorporating a movement of the auxiliary axle, i.e. a movement of the robot base.

In an embodiment of the invention, an automatic modification of the position values can take place by the actual position of the robot base that is to be occupied being approximated to a predetermined reference point (relative to the planned position to be occupied), by the provided position values of a planned position and orientation (that are to be occupied relative to a zero point of the auxiliary axle) of the robot base that is adjustable via the auxiliary axle, being maintained and an automatic modification of the position values takes place in that the zero point of the auxiliary axle is changed.

The zero point of an auxiliary axle means the position and orientation of the auxiliary axle that the auxiliary axle assumes when the position value (given a one-dimensional auxiliary axle) or the position values (given two- or multidimensional auxiliary axles) of the auxiliary axle has or have a value or values of zero in the robot program.

With regard to any embodiment of the disclosed invention, the feature that the actual position of the robot base that is to be occupied relative to the planned position to be occupied converges toward a predetermined reference point (in particular on the work point or the tool reference point), means that the convergence is actually a shortening (decrementing) of the separation between the position of the robot base and the reference point. However, if not only a defined moment in the chronological workflow of the robot program is considered, a convergence considered over a longer chronological workflow of the robot program can also mean that the actual position of the robot base that is to be occupied converges on the work point only on average, meaning that a shortening of the separation of position of the robot base and reference point occurs only as considered over the entire movement workflow.

For example, in the robot program it can thus be provided that the auxiliary axle or the robot base located on this executes a (for example uniform) oscillation movement around a middle position value, in particular the zero point of the auxiliary axle. According to the invention, it can now be provided that this oscillating movement provided by the robot program should be maintained, wherein only the middle position value (in particular the zero point) converges on the reference point. In this case, however, the robot base actually does not always converge on the reference point during the one semioscillation, for example; rather, it also sometimes moves away in certain time segments. However, this is harmless if it is ensured that the robot base converges on the reference point in the middle, i.e. a middle position value (in particular the zero point).

The auxiliary axle moving the robot base can hereby execute a movement synchronized with the movement sequence of the manipulator. Alternatively, the movement of the auxiliary axle can track or run ahead of the movement sequence of the manipulator, as this is presented in more detail in the following.

So that the manipulator can implement the movement pattern provided by the robot program (for example starting a provided welding path) without modification, the axle values of the manipulator that are to be adjusted must be calculated back automatically from the position values (modified by the auxiliary axle) of the position and orientation of the robot base and from the target values (provided by the robot program) of the work point or work points or the path support points. By automatically reverse-engineering [reverse-calculating] the axle values of the manipulator that are to be adjusted, the necessity to have to rewrite the robot program (which provides the movement pattern via work points in Cartesian coordinates) is dispensed with.

Given a robot control method according to the invention, one possibility of reverse-engineering can take place via the steps:

based on the modified position values of the position and orientation of the robot base and based on the target values of the reference point that are provided by the robot program, automatically reverse-engineer axle values of the axles of the manipulator that correspond to the modified position values of the robot base and approach values (programmed depending on the reference point) of the tool reference point; and move elements of the manipulator by adjusting the axles of the manipulator to the reverse-engineered axle values by means of the control device connected with the manipulator.

A computer-assisted implementation of the robot control method can have the following steps:

provide a global coordinate system;

provide a position and orientation of a base coordinate system (linked to a work piece) of a work piece in global coordinates of the global coordinate system;

provide the target values in base coordinates of the base coordinate system;

provide a position and orientation of a robot coordinate system (linked to the robot base) of the manipulator in global coordinates of the global coordinate system depending on a position and orientation of the robot base adjustable via the auxiliary axle;

automatically reverse-engineer the axial values of the axles of the manipulator from the position and orientation of the robot base and the target values for the position and orientation of the tool reference point of the manipulator on the basis of a transformation of the target values from the base coordinate system into the robot coordinate system via the global coordinate system.

The position and orientation of the global coordinate system can be permanently set in the robot controller. The base coordinate system is fixed relative to a work piece, component or other object that should be affected (in particular processed or handled) by the manipulator. The base coordinate system does not necessarily need to be situated directly on the work piece; rather, it can also be situated at a spatial distance (i.e. removed from the work piece), for example on a work piece carrier at a fixed distance and in a fixed orientation relative to the work piece. The target values are programmed and/or taught, for example, i.e. are points in a robot program that are stored in a teach-in method. The robot coordinate system can, for example, be spatially situated within the robot base, for example in a robot frame. The tool reference point can, for example, be a wrist point of a manipulator arm, a tool-specific point that can also form a tool center point (TCP), or another point fixed with regard to the tool borne by the manipulator arm.

In one embodiment, in the robot control method as described above the position and orientation of the base coordinate system and/or of the work point can be modified via automatic movement of an additional auxiliary axle. This means that the position and orientation of the base coordinate system and/or of the work point is modified in that, for example, a work piece relative to which the base coordinate system and/or the work point is fixed is moved. The work piece can, for example, be moved either in that it is manually dismounted, or in that it is moved automatically via an additional auxiliary axle that, for example, can be a rotary or rotary/tilt table on which the work piece is permanently mounted. An automatic movement can be a reorientation of the work piece or a translational displacement, for example via a linear axis, i.e. a carriage, a conveyor belt or hanger. The modified position and/or orientation of the displaced base coordinate system is then calculated from the movement difference of the auxiliary axle.

In a further general embodiment, the robot control method can have the following additional steps:

clocked or continuous provision of target values of a moving reference point provided by a robot program;

automatic adaptation of the movements of the elements of the manipulator via adjustment of the axles of the manipulator, such that a path related to the work point by the robot program—along which path the tool reference point of the manipulator should move—is maintained during a movement of the reference point;

automatic adaptation of the movements of the elements of the manipulator via adjustment of the axles of said manipulator such that—to maintain the path related to the work point by the robot program, along which path the tool reference point of the manipulator should move—an automatic movement of the auxiliary axle is accounted for during the movement of the reference point.

In such an embodiment, the reference point being considered (which work point can be either the work point or the tool reference point) is not offset only once, as would be the case given a one-time reconfiguration of a robot cell. In this embodiment, the reference point can be in motion during the execution of the robot program. For example, this is the case when the work piece moves past the manipulator on a continuously moving conveyor belt and the manipulator should act on the work piece according to the robot program during this movement of the work piece. According to the invention, in this embodiment a programming of a movement of the auxiliary axle or the auxiliary axles can be omitted. A fixed value for the position value of the auxiliary axles can be stored in the robot program, and according to the one of the embodiments according to the invention an automatic movement of the auxiliary axle can be achieved by automatically modifying the position value (given a one-dimensional auxiliary axle) or the position values (given a multidimensional auxiliary axle). The auxiliary axle is inasmuch moved only by an axle-specific value, and not by specifying position and orientation. The path relative to the work point by the robot program (along which path the tool reference point of the manipulator should move) can be maintained during a movement of the work point in that the movements of the elements of the manipulator are automatically adapted by adjusting the axes of the manipulator.

The automatic movement of the auxiliary axle can take place synchronously with a movement of the work point or tool reference point. Alternatively, the automatic movement of the auxiliary axle can precede or follow a movement of the work point or tool reference point. A very dynamic movement workflow can thus result. Visually, the impression can thereby result that the movement of a carriage of a linear axle (for example) or the movement of the robot base is elastically coupled to the movement of the work point or to the movement of the tool reference point of the manipulator.

The position and/or orientation of the auxiliary axle results not solely from the programmed position value but from a sum of the programmed position value and position values or position difference values calculated automatically according to one of the rules according to the invention. In the example of a linear axle of a shuttle car as the auxiliary axle, the automatically calculated position value of the shuttle car (i.e. the position value of the auxiliary axle) can result from an orthogonal projection of the tool center point (TCP) or a wrist point of the manipulator on the length of the possible travel path of the shuttle car. The new position value is the intersection point of the orthogonal projection of the tool center point (TCP) or a wrist point on the length of the possible travel path of the auxiliary axle. For example, if the manipulator arm should now follow a component on a conveyor belt, the Cartesian target position for the robot base migrates with the component solely in that the tool center point (TCP) or the wrist point of the manipulator already follows the component (based on the robot program) and the shuttle car or, respectively, the robot base in turn follows this tool center point (TCP) or wrist point according to the invention. Overall, the shuttle car or the robot base thereby follows the component automatically.

Since an auxiliary axle generally has a greater inertia (is generally slower) than a manipulator hand that can be represented by the tool center point (TCP) or wrist point, in an embodiment of the invention it is provided that, in the current interpolation clock cycle, the auxiliary axle (i.e. the shuttle car, for example) approaches the calculated position value only insofar as is possible without exceeding its dynamic and/or physical limits. The path on which the auxiliary axle (i.e. the shuttle car or the robot base) catches up to the calculated position value can then be compensated by the (significantly more dynamic) manipulator arm, in particular until the auxiliary axle again has time to catch up to the calculated position value in later interpolation clock cycles. Since the position and/or orientation of the auxiliary axle is calculated (as described) from the programmed position value and a computed position value (in particular from the position value of the orthogonal projection), it can thus be that the robot base of the manipulator has an offset (for example to the left or right) relative to the ideal position value. Expressed differently, the manipulator hand tracks the moving component or, respectively, work piece and the auxiliary axle (for example the shuttle car of a linear axle), meaning that the robot base follows the movement of the manipulator hand. In certain situations, however, the effect can arise that the auxiliary axis can overrun the computed position value given an abrupt halt of the component and/or of the manipulator hand. In later interpolation clock cycles, the auxiliary axle can then be driven back again automatically.

However, an automatic modification of the position values for the auxiliary axle takes place only within the working range of the auxiliary axle that is possible due to the design. If the auxiliary axis can thus not completely assume the calculated position value, said auxiliary axle is driven up to its maximum end point, and the missing position difference is compensated by modifying the pose of the manipulator arm. In other words, the movement portion that cannot be executed by the auxiliary axle is thereby compensated by a movement of the manipulator arm.

For example, for the aforementioned reasons it can be sufficient for the robot control method according to the invention includes the step:
 automatically modify the position values of the planned position and orientation (that are to be occupied) of the robot base that is adjustable via the auxiliary axle, such that the actual position of the robot base that is to be occupied relative to the planned position to be occupied converges on the tool reference point of the manipulator or is converged on the tool reference point of the manipulator.

This means that the ideal calculated position values do not always need to be completely achieved by the auxiliary axle. Rather, it is sufficient if the auxiliary axle at least approaches the ideal calculated position value. Considered statically, in an achieved end position of the auxiliary axle the actual position of the robot base that is occupied can merely be approximated to the planned position that is to be occupied. Considered, dynamically, the actual position of the robot base that is occupied at every point in time during a movement of the auxiliary axle can merely approximate the planned position to be occupied.

In a special embodiment of the robot control method according to the invention, the automatic modification of the position values can take place such that the actual position of the robot base that is to be occupied is located at the shortest possible difference from the current position of the tool reference point of the manipulator.

If the tool reference point of the manipulator is selected as a reference point, the actual position of the robot base that is actually to be occupied (which position is located at the shortest possible distance from the current position of the tool reference point of the manipulator) can be determined in that—given a linearly movable, one-dimensional auxiliary axle—a plumb line is dropped on the straight line of the travel path of said auxiliary axle, for example (in particular based on the attitude of the auxiliary axle that is known in global coordinates), and in fact through the current tool reference point of the manipulator. The intersection point of the plumb line with the straight line of the travel path (which straight line is situated at a right angle to the plumb line) is then the location of the position that is actually to be occupied by the shuttle car or, respectively, the robot base. A determination of the actual position that is to be occupied is therefore mathematically possible in a very simple manner, such that the result can be calculated very quickly corresponding to algorithms implemented in the robot controller. Moreover, in known robot controllers the current tool reference point of the manipulator is often already provided in global coordinates, such that a separate transformation calculation of the tool reference point of the manipulator into the global coordinate system can be dispensed with.

DESCRIPTION OF THE PREFERRED EMBODIMENTS

Figure 1:
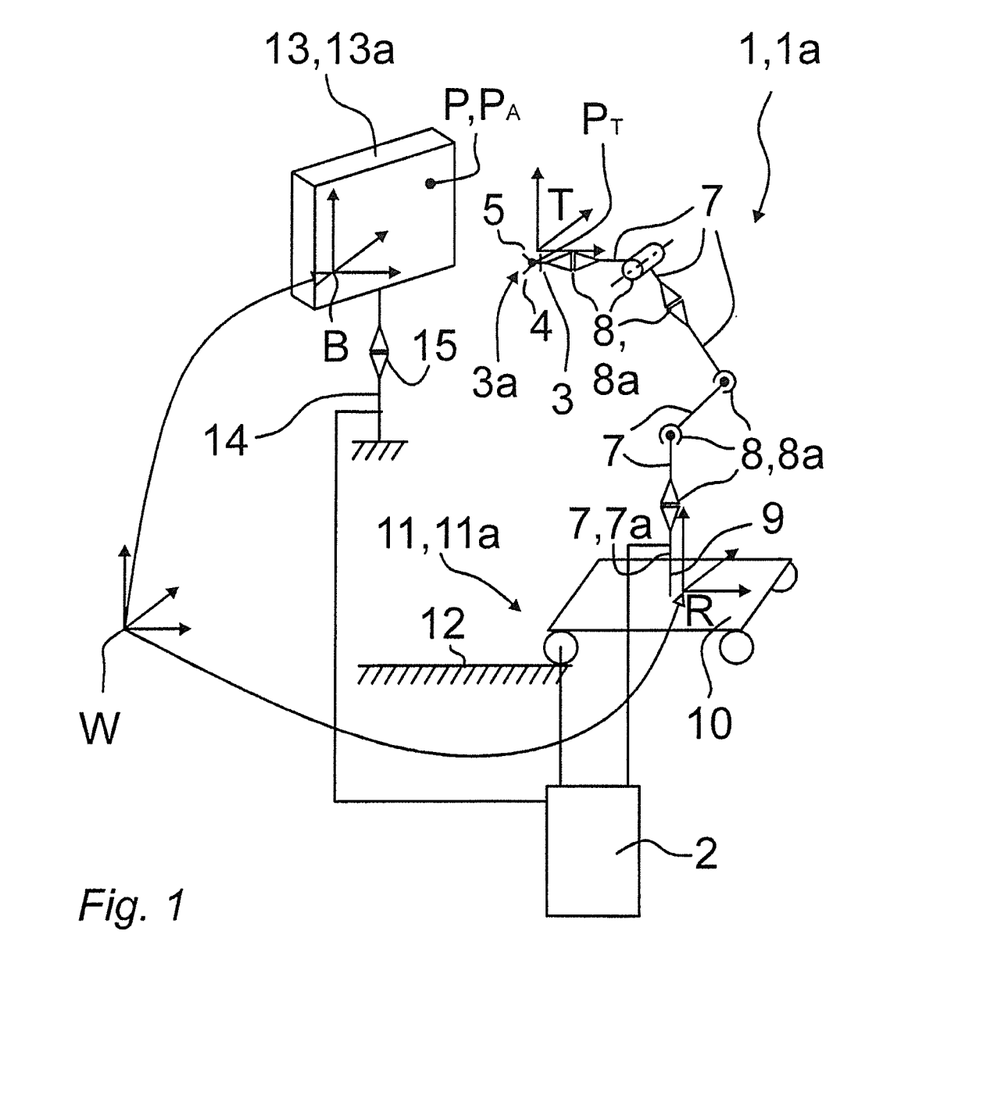
FIG. 1 is a systemic representation of a robot-integrated workspace with a shuttle car on which a manipulator arm is mounted (supported) such that it can be moved, and with a module that is mounted (supported) such that it can be reoriented by a rotatory table.

A manipulator 1 in the form of a manipulator arm 1*a* that is connected with a robot controller 2 is symbolically shown in FIG. 1. A robot program is stored in the robot controller 2, in particular as program source code. The manipulator 1, together with the robot controller 2, forms a robot that can be an industrial robot. The robot controller 2 is set up to automatically move the manipulator arm 1a.

On its end effector flange 3, the manipulator arm 1a has an end effector 3a, in particular in the manner of a gripper. The end effector 3a can inasmuch specifically also be designated as a gripper. The shown end effector 3a can, for example, have two gripper jaws 4 and 5 that can be moved against one another. The manipulator arm 1a has elements 7 that are connected with one another via joints 8. The end effector 3a is moved by moving the joints 8 of the manipulator arm 1a. The joints 8 form axes 8a of the manipulator 1.

The first element 7a of the manipulator arm 1a can form a robot base 9. The robot base 9 is connected with a shuttle car 10 of a linear axle 11a. A robot coordinate system R that can be described via a global coordinate system W is permanently defined relative to the robot base 9. For this purpose, the shuttle car 10 is mounted such that it can be displaced linearly on a frame 12 that can have rails. Frame 12 and shuttle car 10 form an auxiliary axle 11 of the robot-integrated work space.

A work piece 13 and/or a work piece carrier 13a is borne so as to be adjustable on an additional auxiliary axle 14 of the robot-integrated work space. In the shown exemplary embodiment, the auxiliary axle 14 is designed as a rotatory table with a rotation axle 15. In the shown exemplary embodiment, both the auxiliary axle 11 and the auxiliary axle 14 are controlled by the robot controller 2.

In the shown exemplary embodiment, a predetermined reference point P is represented by a work point $P_A$ on the work piece 13. According to an example of a robot program, the reference point P or the work point should serve as a point of convergence for the end effector 3a of the manipulator arm 1a. For this purpose, a tool reference point $P_T$ is associated with the end effector 3a, at which tool reference point $P_T$ the origin of the tool coordinate system T is also situated. Moreover, a fixed base coordinate system B is associated with the work piece 13. Position and orientation of the base coordinate system B and of the tool coordinate system T can be described relative to a fixed, predetermined global coordinate system W. Alternatively or additionally, the position and orientation of the base coordinate system B can be described in the tool coordinate system T or a flange coordinate system of the robot. The flange coordinate system can be permanently defined relative to the tool coordinate system T.

Figure 2:
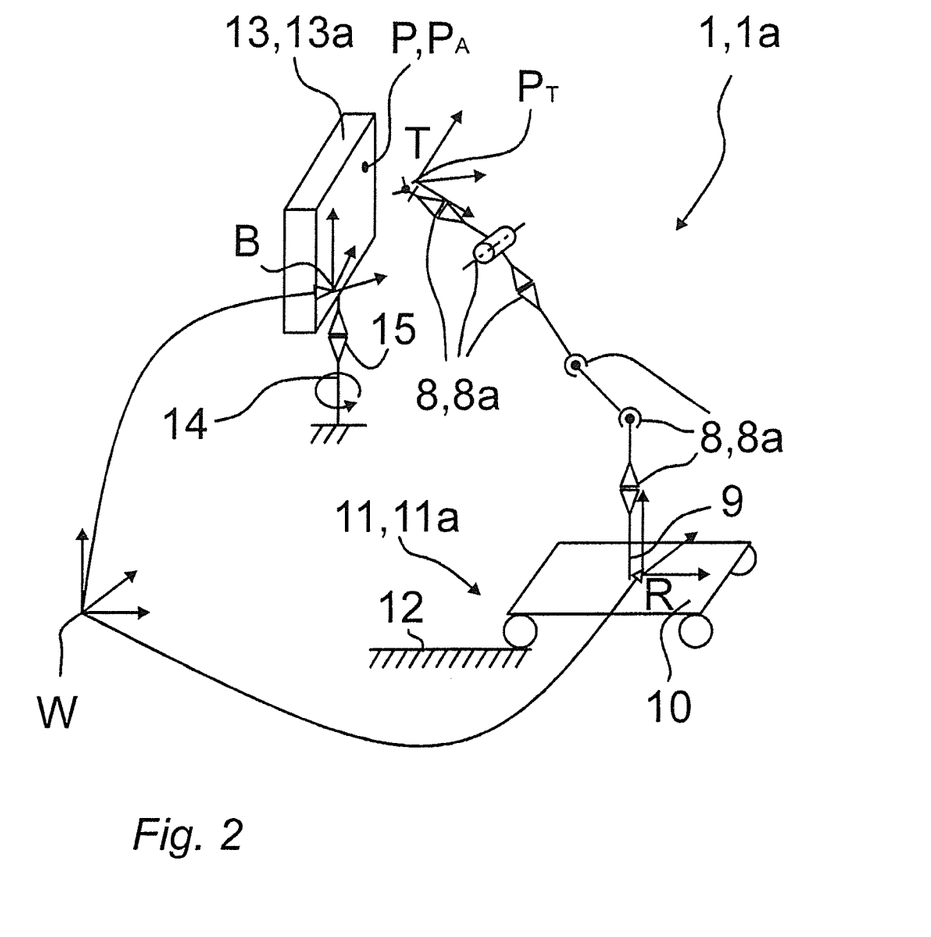
FIG. 2 shows the robot-integrated work space with a module reoriented relative to the presentation according to FIG. 1, and the manipulator arm in an extended position.
Figure 3:
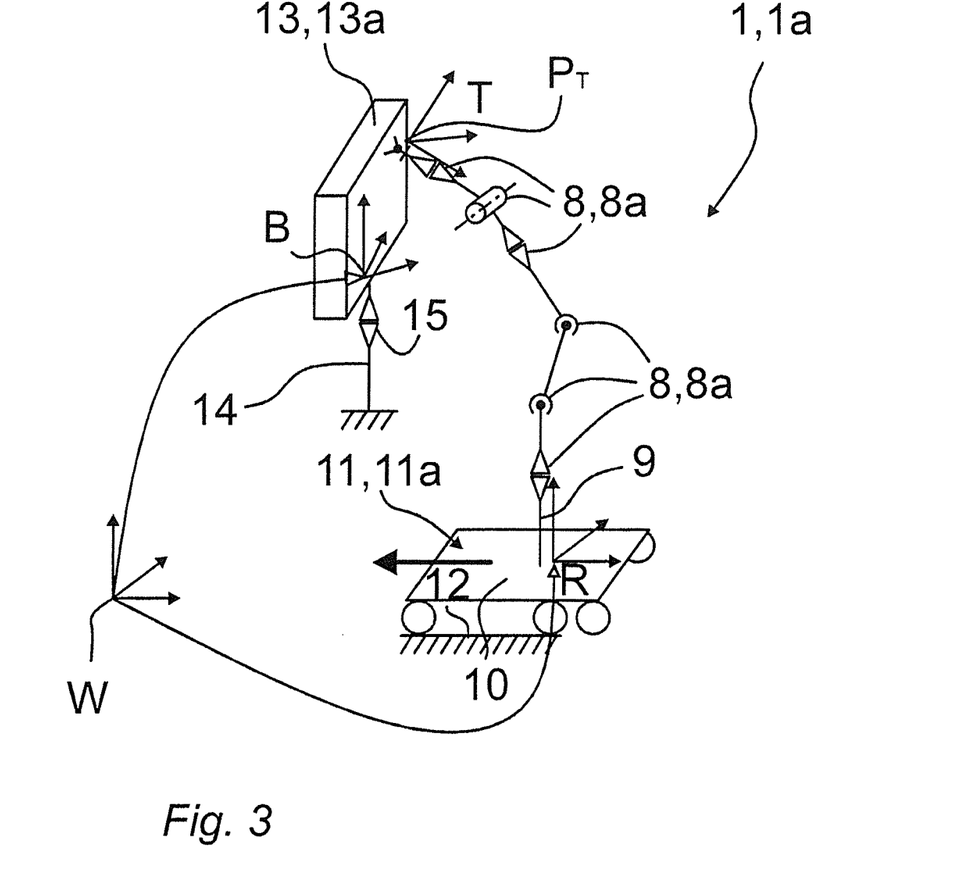
FIG. 3 shows the robot-integrated work space according to FIG. 2 with a shuttle car converging on the work point or, respectively, the tool reference point.

In FIG. 2 it is now schematically indicated how the manipulator 1 attempts to cause its end effecter 3a to reach the work point $P_A$, by adjusting its axles 8, 8a or attempts to converge its tool reference point $P_T$ on the work point $P_A$. As is indicated in the exemplary embodiment, this is possible either only by an extreme extension of the joints 8 of the manipulator, or may not be possible at all, such that the work point $P_A$ cannot be reached at all by the end effector 3a, for example. In such cases, in spite of fixed programming of the position value or position values of the auxiliary axle 11 (i.e. of the shuttle car 10) the robot base 9 can be automatically converged on the predetermined reference point P (in particular on the work point $P_A$ or on the tool reference point $P_T$) via the robot control method according to the invention, such that this predetermined reference point P can be reached more easily (or at all) by the end effector 3a or the tool reference point $P_T$ (i.e. with more advantageous axle positions of the manipulator arm 1a), as this is schematically depicted in FIG. 3.

Figure 4:
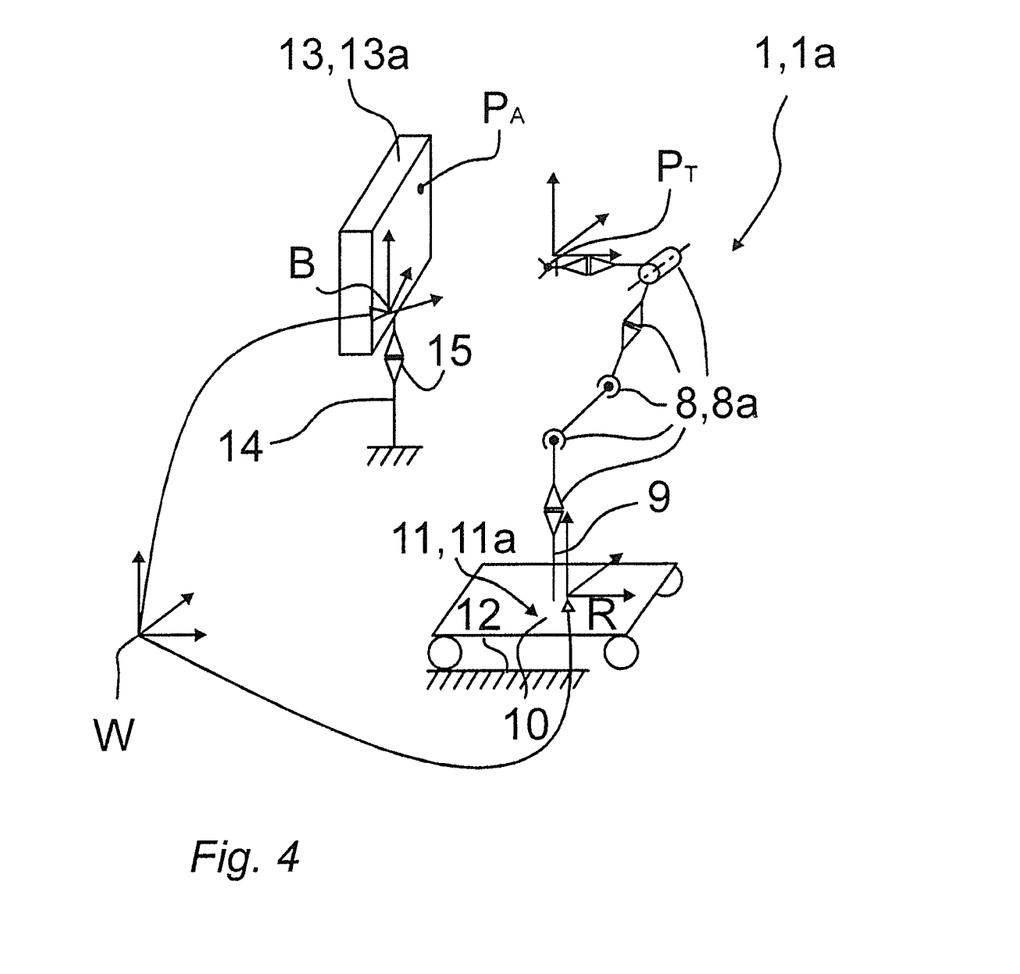
FIG. 4 shows the robot-integrated work space according to FIG. 2 with a vertical shuttle car driven below the tool reference point or robot base driven under the tool reference point.

As schematically indicated in FIG. 4, in a modified embodiment of the invention an automatic modification of the position values of the robot base 9 can take place such that it is not the work point $P_A$ but rather the tool reference point $P_T$ that is used as a predetermined reference point P. The robot base 9 does not converge on the work point $P_A$ but rather on the tool reference point $P_T$. Via such a robot control method, the robot base 9 is driven more or less continuously below the tool reference point $P_T$ or below the end effector 3a via the shuttle car 10 of the auxiliary axle 11.

Figure 5:
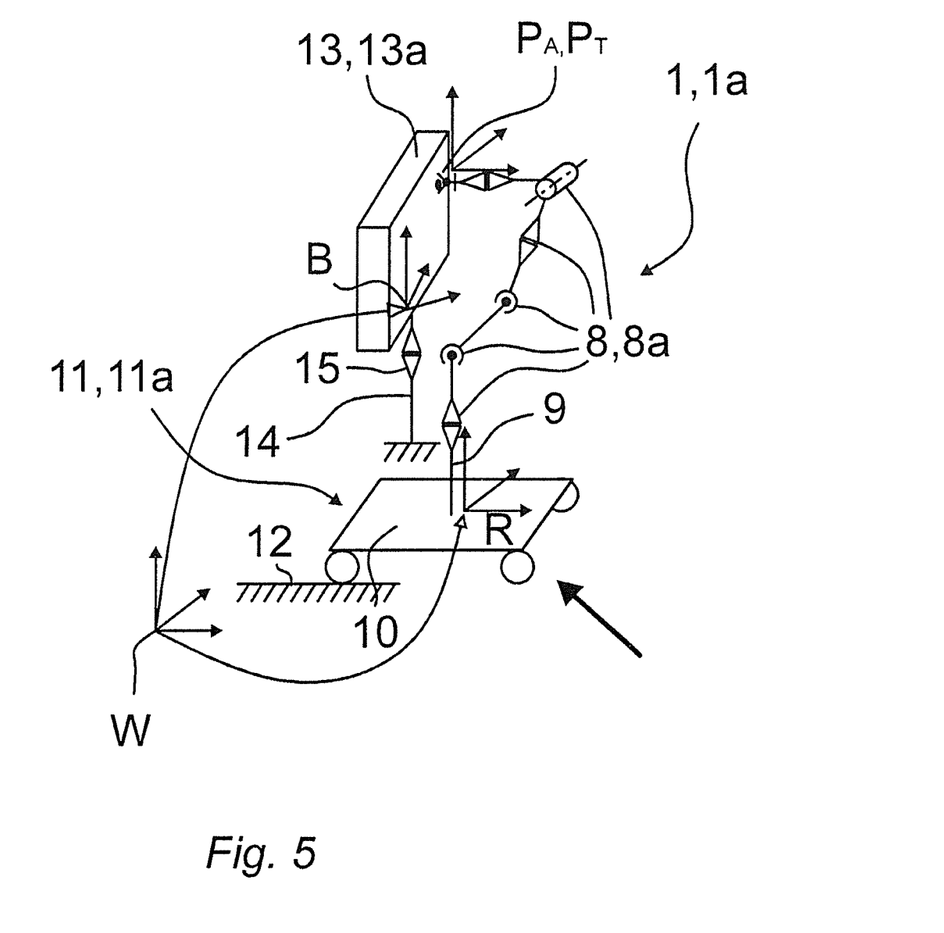
FIG. 5 shows the robot-integrated work space with a shuttle car that can travel in the plane, which shuttle car is both driven vertically under the tool reference point and converges on the work point.

In FIG. 5 it is shown that the auxiliary axle 11 can be not only a one-dimensional auxiliary axle 11 (as indicated in FIG. 1 through FIG. 4) but also can (as indicated by the arrow in FIG. 5) form a two-dimensional auxiliary axle 11. For example, the two-dimensional auxiliary axle 11 can be a car platform, in particular an omnidirectional chassis. In this embodiment, an automatic modification of the position values of the robot base 9 can also take place such that a point situated near both the work point $P_A$ and the tool reference point $P_T$ is used as a predetermined reference point P. However, in this embodiment as well only the work point $P_A$ or the tool reference point $P_T$ can be used as a predetermined reference point P.

Although modifications and changes may be suggested by those skilled in the art, it is the intention of the inventor to embody within the patent warranted hereon all changes and modifications as reasonably and properly come within the scope of his contribution to the art.

I claim as my invention:

1. A robot control method for operating a robot system comprising a robot manipulator connected to a robot base, said robot manipulator comprising a plurality of manipulator axles, and said robot base comprising at least one base axle that is different from said manipulator axles, and a computerized robot controller in communication with said robot manipulator and said robot base, said method comprising:

providing said robot controller with a robot program that causes said robot controller to operate said robot manipulator and said robot base from said robot controller according to the robot program by automatically controlling movement of said manipulator axles and said at least one base axle, to adjust a tool reference point of said robot manipulator dependent on a work point of the robot program, said work point having a position and an orientation associated therewith, said robot program providing target values for said position and said orientation of said work point;

in said robot controller, from said target values, executing said robot program to determine planned values for a planned position and orientation of said robot base to be achieved by controlling movement of said at least one base axle by said robot controller in order to adjust said tool reference point dependent on said work point;

in said robot controller,
automatically changing said planned values, without changing said work point, to changed values of said position and orientation of said robot base, that change said position and orientation of said robot base, relative to said planned position and orientation of said robot base, that is to be occupied by said robot base in order to adjust said tool reference point dependent on said work point, with said changing being based on said changed values and said target values, to cause said position and orientation of said robot base to converge on a predetermined reference point to cause said position of said robot based relative to said planned orientation and position to be located at a minimized distance from a current position of said tool reference point, and automatically reverse-calculating respective axle values for the respective manipulator axles that correspond to said changed values for said robot base, and automatically programming approach values of said tool reference point dependent on said reference point; and from said robot controller, automatically moving elements of said robot manipulator by adjusting the respective manipulator axles to the reverse-calculated axle values.

2. The method as claimed in claim 1 comprising using said work point as said predetermined reference point.

3. The method as claimed in claim 1 comprising using said tool reference point as said predetermined reference point.

4. The method as claimed in claim 1 comprising:
in said robot controller, assigning a zero point, in said robot program, to said at least one base axle, and automatically changing said planned values for said robot base to said changed values by maintaining said target values and modifying said zero point to cause said position and orientation of said robot base relative to said planned position and orientation to converge on said predetermined reference point.

5. The method as claimed in claim 1 wherein said reference point is a moving reference point, and comprising:
in said robot program in said robot controller, generating clocked or continuous target values dependent on said moving reference point;
in said robot controller, automatically adapting movements of elements of said robot manipulator by adjusting said manipulator axles to cause a path associated with the work point by the robot program, along which path said tool reference point of said robot manipulator should move, to be maintained during movement of said reference point; and
in said robot controller, maintaining said path of said tool reference point dependent on said movement of said at least one base axle during movement of said work point.

6. The method as claimed in claim 1 comprising, via said robot controller, synchronizing automatic movement of said at least one base axle with movement of said work point or said tool reference point.

7. The method as claimed in claim 1 comprising, in said robot controller, causing automatic movement of said at least one base axle to proceed ahead of a movement of said work point or said tool reference point.

8. The method as claimed in claim 7 comprising, in said robot controller, maintaining a path relative to said work point or said tool reference point along which said tool reference point should move, during movement of said work point by automatically adjusting movements of elements of said robot manipulator by automatically adjusting said manipulator axles.

9. The method as claimed in claim 1 comprising, in said robot controller, causing automatic movement of said at least one base axle to trail a movement of said work point or said tool reference point.

10. The method as claimed in claim 9 comprising, in said robot controller, maintaining a path relative to said work point or said tool reference point along which said tool reference point should move, during movement of said work point by automatically adjusting movements of elements of said robot manipulator by automatically adjusting said manipulator axles.

11. The method as claimed in claim 1 comprising:
in said robot controller, automatically generating said changed values by causing said position and orientation of said robot base relative to said planned position and orientation to converge on said tool reference point.

12. The method as claimed in claim 1 comprising:
providing a global coordinate system to said robot controller;
providing a position and orientation of a base coordinate system associated with a work piece in coordinates of said global coordinate system to said controller;
providing target values in said base coordinates to said controller;
providing a position and orientation of a robot coordinate system associated with said robot base in coordinates of said global coordinate system, dependent on position and orientation of said robot base adjustable by said at least one base axle; and
automatically reverse-calculating respective axial values of the manipulator axles from the position and orientation of said robot base and said target values for the position and orientation of said tool reference point of said robot manipulator based on a transformation of target values from said base coordinate system into said robot coordinate system via said global coordinate system.

13. The method as claimed in claim 12 comprising modifying the position and orientation of said base coordinate system by automatic movement of an additional base axle, in addition to automatic movement of said at least one base axle.

14. The method as claimed in claim 12 comprising modifying the position and orientation of said work point by automatic movement of an additional base axle, in addition to automatic movement of said at least one base axle.

* * * * *